(Model.)

H. TORLEY.
PROCESS OF MAKING DOUBLE LOOP SPRINGS.

No. 388,160. Patented Aug. 21, 1888.

Witnesses.

Inventor
Heinrich Torley
per

Attorney.

UNITED STATES PATENT OFFICE.

HEINRICH TORLEY, OF HOHEN-LIMBURG, WESTPHALIA, PRUSSIA, GERMANY.

PROCESS OF MAKING DOUBLE-LOOP SPRINGS.

SPECIFICATION forming part of Letters Patent No. 388,160, dated August 21, 1888.

Application filed November 3, 1887. Serial No. 254,207. (Model.) Patented in Germany February 25, 1887, No. 40,961.

*To all whom it may concern:*

Be it known that I, HEINRICH TORLEY, a subject of the Emperor of Germany, and a resident of Hohen-Limburg, in the Province of Westphalia, Prussia, Germany, have invented new and useful Improvements in Double-Loop Springs and Process of Making the Same, (for which I have obtained a patent in Germany, No. 40,961, dated February 25, 1887,) of which the following is a full, clear, and exact specification.

My invention relates to a new article which I call "a double-loop spring" and to the making of the same, and which may be used for various practical purposes and for ornamenting articles.

The accompanying drawings show the double-loop spring in various stages of its formation, and also shows the finished article.

Figure 1:
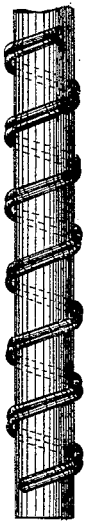
Figure 2:
Figure 3:
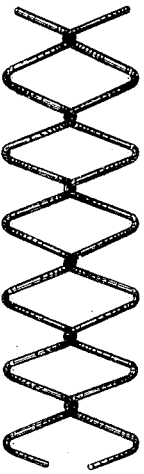
Figure 4:
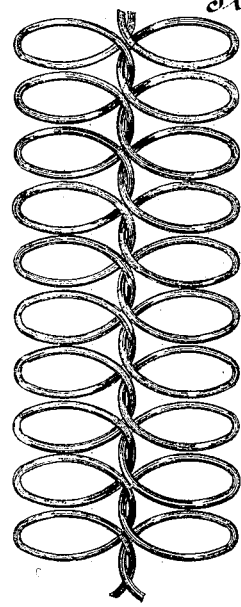
Figure 4:
Figure 4:
Figure 4:
Figure 5:
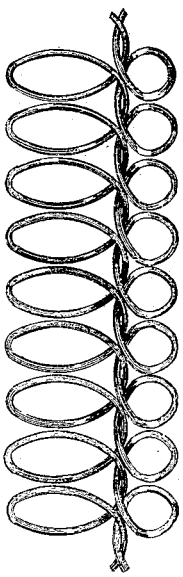
Figure 4:
Figure 4:
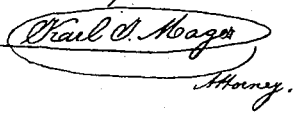

Figure 1 represents the double wire wound on a smooth bar. Fig. 2 shows it taken off from the bar, appearing like a double screw or spiral spring. Fig. 3 shows the two wires forming the double-loop spring drawn asunder before being pressed flat. Fig. 4 shows the finished double-loop spring pressed flat. Fig. 5 shows the double-loop spring as a spring in angle-iron form.

In making my double loop springs I proceed as follows: Two wires are wound on a smooth bar, of iron, steel, or the like, of a thickness corresponding to the width which the spring shall ultimately have, and as shown by Fig. 1 of the accompanying drawings. The bar is, by preference, of circular section; but any flattened section might be used. After a sufficient length of wire has been wound on the bar, it is pushed off from the same and the two wires are drawn asunder—one to the left and one to the right—so that they appear, as shown by Fig. 3, like two screw-lines or screw-springs twisted or interlaced one in the other. This double-screw spring is then passed between two rollers and pressed flat, so that it takes the form shown by Fig. 4. In this its finished form the double-loop spring may be used in a variety of cases as a strong but very flexible flat spring, where until now heavy springs of solid bands of steel had to be used where often lighter springs would have answered the purpose better.

The new double-loop spring has the quality that one set of windings may be shifted toward or into the other, and by its capability of being bent in any direction it is possible to use it in an angular form, which as yet is impossible with any other form of springs. The continuous row of the interlaced loops forms the sides of the angle-iron section. The double-loop spring may with advantage be used as a means for decorating a great variety of articles.

Having now fully described my invention, what I desire to claim and secure by Letters Patent is—

The method of making double-loop springs, which consists in winding two wires side by side round a smooth bar, shifting them off from the bar, and drawing the product, now appearing as a double screw or spiral spring, asunder, forming, apparently, two interlaced spiral springs, and passing it between two rollers or pressing it flat under some other convenient pressing apparatus.

In testimony that I claim the foregoing as my invention I have signed my name, in presence of two witnesses, this 3d day of October, 1887.

HEINRICH TORLEY.

Witnesses:
 EWALD HIGCHOPF,
 GEO. KOCH.